US010878291B2

(12) United States Patent
Sree Prakash et al.

(10) Patent No.: US 10,878,291 B2
(45) Date of Patent: Dec. 29, 2020

(54) VISUALLY GUIDED QUERY PROCESSING

(71) Applicant: International Business Machines Corporation, Armonk, NY (US)

(72) Inventors: Ashok Pon Kumar Sree Prakash, Bangalore (IN); Ayushi Dalmia, Kolkata (IN); Amith Singhee, Bangalore (IN); Digbalay Bose, Los Angeles, CA (US); Sumanta Mukherjee, Karnataka (IN); Raghavendra Singh, New Delhi (IN); Vikas C. Raykar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/367,500

(22) Filed: Mar. 28, 2019

(65) Prior Publication Data

US 2020/0311480 A1 Oct. 1, 2020

(51) Int. Cl.
*G06K 9/62* (2006.01)
*G06N 3/08* (2006.01)
(Continued)

(52) U.S. Cl.
CPC .......... *G06K 9/6262* (2013.01); *G06F 16/51* (2019.01); *G06F 16/532* (2019.01); *G06F 16/56* (2019.01); *G06K 9/6201* (2013.01); *G06N 3/08* (2013.01)

(58) Field of Classification Search
CPC .... G06K 9/6262; G06K 9/6201; G06F 16/51; G06F 16/532; G06F 16/56; G06N 3/08
(Continued)

(56) References Cited

U.S. PATENT DOCUMENTS 8,891,878 B2 11/2014 Rane
9,508,167 B2 11/2016 Kim
(Continued)

FOREIGN PATENT DOCUMENTS

CN 103632362 B 3/2017

OTHER PUBLICATIONS

Belongie et al., "Visual Recognition with Humans in the Loop", ACVHL in conjunction with CVPR 2010, UC San Diego, Jun. 14, 2010, 44 pages, <https://www.cc.gatech.edu/~parikh/acvhl2010.htm>.
(Continued)

*Primary Examiner* — Marceau Milord
(74) *Attorney, Agent, or Firm* — William H. Hartwell; Isaac J. Gooshaw

(57) ABSTRACT

A neural network based search system is provided. A first digital image is analyzed by a user device. A targeted object in the first digital image is determined based, at least in part, on (i) the characteristics of the first digital image and (ii) the features of the targeted object. A vector array is generated based, at least in part, on (i) the first digital image and (ii) the targeted object. The vector array is analyzed by the user device. The targeted object is determined based, at least in part, by the vector array. A plurality of digital images is identified based, at least in part, on the similarity of the plurality of digital images and (i) the first digital image and (ii) the targeted object responsive to identifying a plurality of digital images, a query processing is generated. The query map is generated on a user device.

20 Claims, 4 Drawing Sheets

(51) Int. Cl.
*G06F 16/532* (2019.01)
*G06F 16/51* (2019.01)
*G06F 16/56* (2019.01)

(58) Field of Classification Search
USPC .................................................. 382/156, 305
See application file for complete search history.

(56) References Cited

U.S. PATENT DOCUMENTS

| | | | |
|---|---|---|---|
| 10,037,592 B2* | 7/2018 | Kolb, V ................... | G06T 3/40 |
| 10,347,017 B2* | 7/2019 | Ruble ...................... | G06F 9/451 |
| 10,580,317 B2* | 3/2020 | Chetlur ............ | H04N 21/42201 |
| 10,585,575 B2* | 3/2020 | Kindelsberger .... | G06F 3/04847 |
| 10,614,297 B2* | 4/2020 | Chetlur ............ | H04N 21/44008 |
| 2007/0110290 A1* | 5/2007 | Chang ...................... | G06T 5/10 |
| | | | 382/128 |
| 2011/0158533 A1 | 6/2011 | Gutelzon | |
| 2015/0363481 A1* | 12/2015 | Haynes ................. | G06Q 10/10 |
| | | | 707/748 |
| 2016/0103883 A1* | 4/2016 | Ramani ................. | G06Q 10/00 |
| | | | 707/725 |
| 2017/0270122 A1* | 9/2017 | He ................... | G06F 16/24578 |
| 2017/0339093 A1* | 11/2017 | Pesavento ........... | G06F 16/9535 |
| 2018/0219814 A1* | 8/2018 | Maarek ................. | G06Q 50/01 |

OTHER PUBLICATIONS

Thomee et al., "Interactive search in image retrieval: a survey", Int J Multimed Info Retr (2012) 1:71-86, Published online: Jun. 8, 2012, 16 pages.
Wah et al., "Multiclass Recognition and Part Localization with Humans in the Loop", IEEE International Conference on Computer Vision (ICCV), Barcelona, 2011, 8 pages.

* cited by examiner

VISUALLY GUIDED QUERY PROCESSING

BACKGROUND OF THE INVENTION

The present invention relates generally to the field of machine learning, and more particularly to neural networks.

The proliferation of internet content that is available for online search has enriched the ability of users to find desired content. In addition, this corpus of internet available content is growing at an incredible rate. If a user is able to provide the needed search terms to differentiate between various content, then a search engine may be able to locate desired information. However, as the body of available internet content increases, it can become increasingly difficult and time consuming to locate specific content.

SUMMARY

Embodiments of the present invention provide a method, system, and program product to generate a query of digital images based on a targeted object using a neural network search system.

A first embodiment encompasses a method for executing a neural network search system. One or more processors analyze a first digital image. The one or more processors determine a targeted object in the first digital image based, at least in part, on (i) one or more characteristics of the first digital image and (ii) a feature of the targeted object. The one or more processors generate a vector array based, at least in part, on (i) the first digital image and (ii) the targeted object. The one or more processors analyze the vector array. The one or more processors determine the targeted object based, at least in part, on the vector array. The one or more processors generate a query processing based, at least in part, on the vector array of the first digital image. The one or more processors identify a plurality of digital images based, at least in part, on the similarity of the plurality of digital images and (i) the first digital image and (ii) the targeted object. Responsive to identifying a plurality of digital images, the one or more processors generate, a query map.

A second embodiment encompasses a computer program product for executing a neural network search system. The computer program product includes one or more computer-readable storage media and program instructions stored on the one or more computer-readable storage media. The program instructions include program instructions to analyze a first digital image. The program instructions include program instructions to determine a targeted object in the first digital image based, at least in part, on (i) one or more characteristics of the first digital image and (ii) a feature of the targeted object. The program instructions include program instructions to generate a vector array based, at least in part, on (i) the first digital image and (ii) the targeted object. The program instructions include program instructions to analyze the vector array. The program instructions include program instructions to determine the targeted object based, at least in part, on the vector array. The program instructions include program instructions to generate a query processing based, at least in part, on the vector array of the first digital image. The program instructions include program instructions to identify a plurality of digital images based, at least in part, on the similarity of the plurality of digital images and (i) the first digital image and (ii) the targeted object. Responsive to identifying a plurality of digital images, the program instructions include program instructions to generate, a query map.

A third embodiment encompasses a computer system for executing a neural network search system. The computer system includes one or more computer processors, one or more computer readable storage medium, and program instructions stored on the computer readable storage medium for execution by at least one of the one or more processors. The program instructions include program instructions to analyze a first digital image. The program instructions include program instructions to determine a targeted object in the first digital image based, at least in part, on (i) one or more characteristics of the first digital image and (ii) a feature of the targeted object. The program instructions include program instructions to generate a vector array based, at least in part, on (i) the first digital image and (ii) the targeted object. The program instructions include program instructions to analyze the vector array. The program instructions include program instructions to determine the targeted object based, at least in part, on the vector array. The program instructions include program instructions to generate a query processing based, at least in part, on the vector array of the first digital image. The program instructions include program instructions to identify a plurality of digital images based, at least in part, on the similarity of the plurality of digital images and (i) the first digital image and (ii) the targeted object. Responsive to identifying a plurality of digital images, the program instructions include program instructions to generate, a query map.

DETAILED DESCRIPTION

Figure 1:
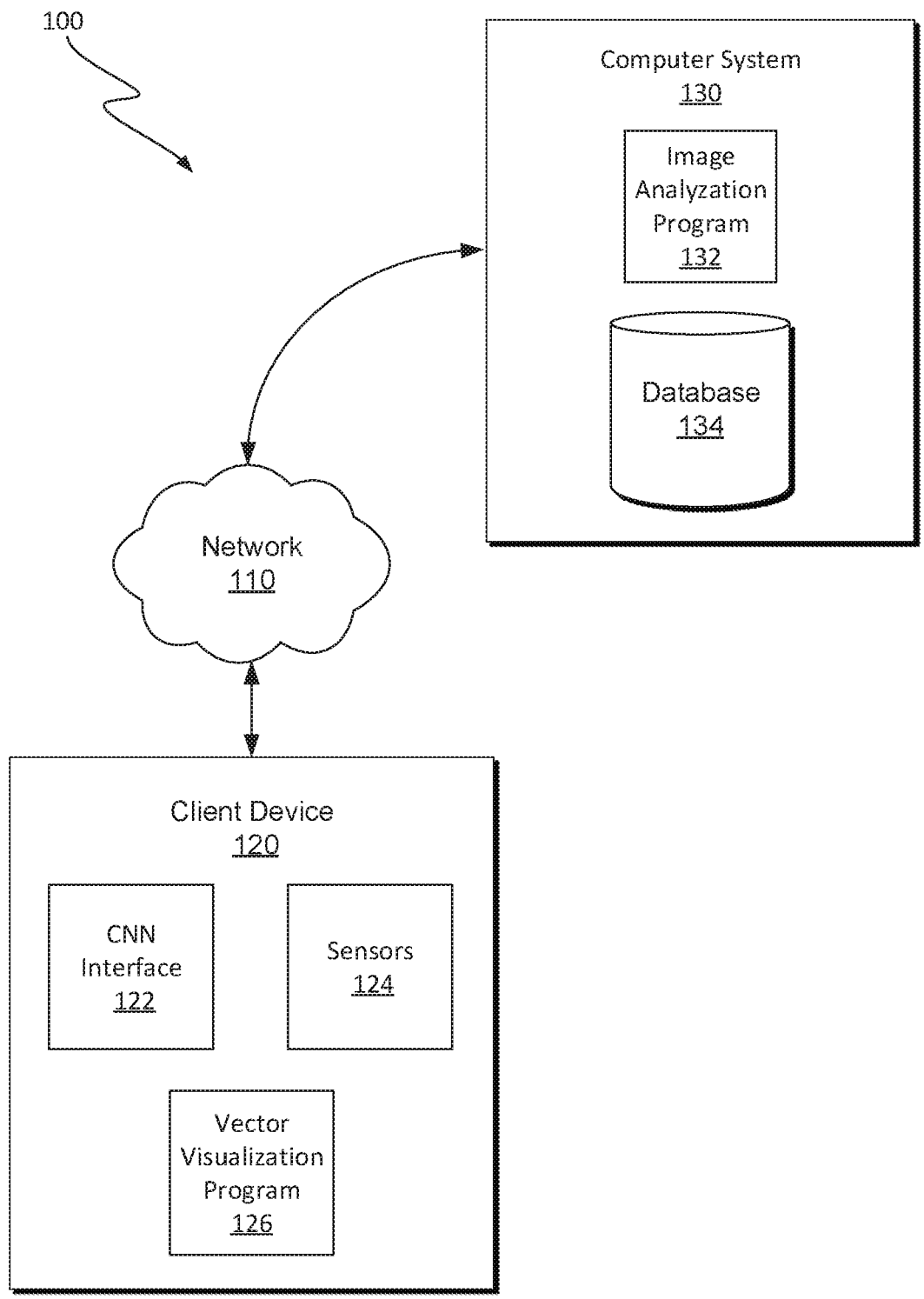
FIG. 1 is a functional block diagram illustrating a computing environment, in which a neural network search system is utilized, in accordance with an exemplary embodiment of the present invention.

In certain search domains, while searching for visually similar images, machine learning is called on to find an exact match to an original image. Neural networks learn a representation of a digital image which can be utilized to generate a heat map that is analyzed to determine which region (i.e., object) is observed with importance to the network in the digital image. The neural networks begin a deep search, which provides a way to search a catalog of images to obtain an exact match to an image and an image is selected and populated on a computing device.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to a guided deep search and pattern recognition are known, these solutions may be inadequate to provide the necessary search results from analyzing an image and pattern, because these solutions often require a controlled environment, annotated images, and images with certain characteristics, such as, for example, a level of clarity. Further, it is difficult to articulate the design of an image using textual attributes alone. In addition, the image can contain an unspecified or unidentified background that distorts a specified item in the image, which can make it difficult for a search program to identify the specified item in the image. Embodiments of the present invention provide a solution that enables a user to make selections of visual elements in a graphical user interface that further refine the parameters of a search query. In some embodiments, these visual elements are generated based on various portions of a heat map corresponding to a given starting image. In some scenarios and embodiments, such selections are leveraged to generate a different, and sometimes more specific, search query for images that are related to the given starting image. In some embodiments, the user is presented with a version of the given starting image that is mapped to the heat map. As such, user selection of a given portion of the starting image is interpreted to be a selection of the portion of the heat map that is mapped to the selected portion of the starting image. In some such scenarios and embodiments, the user may not be aware of the heat map, but still can indicate selection of the portion of the heat map via the mapping. For example, a user circles a portion of an image on a touch screen. The system maps the circle to the corresponding heat map and determines what part of the heat map is included in that circle based on the mapping. The system interprets the part of the heat map that is in the circle as a user selection of that portion of the heat map and generates a search query based on at least some of the characteristics corresponding to that portion of the heat map. As such, the user selection of the portion of the initial image controls, at least in part, the query generation and processing to yield more refined search results.

Embodiments of the present invention recognize that neural networks used for image searches generally generate a representation which is utilizes to generate a heat map based on a given digital image. However, the digital image may have a background that is not conducive to understand the correct representation in the digital image, and therefore the corresponding heat map may not highlight the correct targeted object in the digital image. Further, the heatmap of the digital image can draw attention or otherwise focus on an object that is distinct from the targeted object contained within the digital image. Additionally, neural networks typically populate a computing device with search results relating to the object analyzed in the digital image. As such, these and similar systems may, in certain circumstances, be ineffective of visualizing the targeted object and searching for a similar object outside of a controlled environment when compared to other solutions. The present invention provides a more effective system for searching for a similar image of the targeted object when compared to certain other solutions for a deep search using a neural network.

Embodiments of the present invention provides: (i) a neural network capable of completing a deep search of a targeted object, (ii) visualizing the embedding of the images of the search result in a low dimension, and (iii) provides user navigation in the low dimension space to modify the search result neighborhood to accurately locate the correct similar image. The present invention recognizes that by providing the search results in a low dimension visualization and guiding user navigation through the search results. The present invention provides a more effective system for locating a similar image to a given targeted image.

In one embodiment, executing a neural network search system is provided. In one embodiment, a first digital image is generated. A targeted object is determined in the first digital image based, at least in part, on (i) one or more characteristics of the first digital image and (ii) a feature of the targeted object. A vector array is generated based, at least in part, on (i) the first digital image and (ii) the targeted object. The vector array is analyzed. The targeted object is determined based, at least in part, on the vector array of the first digital image. A plurality of digital images is identified based, at least in part, on the similarity of the plurality of digital images and (i) the first digital image and (ii) the targeted object. Responsive to identifying a plurality of digital images, a query map is generated.

In one embodiment, the first digital image is populated on a computing device. Responsive to populating the first digital image on a computing device, the first digital image is analyzed. Dimensions of the characteristics and the features of the first digital image are identified based, at least in part, on the vector array. The targeted object is identified in the first digital image based, at least in part, on (i) the characteristics and features of the first digital image and (ii) the dimensions of the characteristics and the features of the first digital image. A vector array is generated based, at least in part, on (i) the characteristics and features of the first digital image and (ii) the dimensions of the characteristics and features of the first digital image.

In one embodiment, responsive to the vector array being generated based, at least in part, on the characteristic and features of the first digital image, the vector array is analyzed. A plurality of indexed digital images located on a database are identified, wherein the plurality of indexed digital images have (i) an associated vector array and (ii) the dimensions of the associated vector array. One or more vector array associated with the plurality of indexed digital images are analyzed. A minimum threshold of similarity of the plurality of indexed digital images to the first digital image is determined based, at least in part, on (i) the characteristics and features of the plurality of indexed digital images and (ii) the dimensions of the plurality of indexed digital images. The plurality of indexed digital images associated with the first digital image are matched based, at least in part, on (i) the characteristics and features of the first digital image and (ii) the dimensions of the first digital image.

In one embodiment, responsive to a plurality of digital images being identified based, at least in part, on matching the plurality of indexed digital images associated with the first digital image, reducing the dimensions of the vector array of (i) the first digital image and (ii) the plurality of indexed digital images.

In one embodiment, a map of indexed digital images is generated based, at least in part, on the plurality of indexed digital images that have been determined to meet the minimum threshold of similarity. The map of indexed digital images is assembled into regions based, at least in part, on the threshold of similarity between the plurality of indexed digital images and the first digital image. The map of indexed digital images is sent to the client device.

In one embodiment, data instruction a client device to augment the map of the indexed digital images is received. Responsive to receiving data instructions to augment the map of the indexed digital images, the data instructions to generate a second map of indexed digital images is analyzed. A second map of the indexed digital images displaying an augmented map on the client device is generated. Data received on the client device is monitored. A selection of an image from the map of indexed digital images has been performed is determined. The threshold of similarity is updated based, at least in part, on the selection of the image.

In one embodiment, the data received by the client device is monitored. The data received by the client device is analyzed.

The present invention will now be described in detail with reference to the Figures.

FIG. 1 is a functional block diagram illustrating a computing environment, generally designated 100, in accordance with one embodiment of the present invention. Computing environment 100 includes client device 120 and computer system 130 connected over network 110. Client device 120 includes CNN interface 122, sensors 124 and vector visualization program 126. Computer system 130 includes image analyzation program 132 and database 134.

In various embodiments of the present invention, client device 120 is a computing device that can be a standalone device, a server, a laptop computer, a tablet computer, a netbook computer, a personal computer (PC), a personal digital assistant (PDA), smartwatch, a desktop computer or any programmable electronic device capable of receiving, sending, and processing data. In general, client device 120 represents any programmable electronic device or combination of programmable electronic devices capable of executing machine readable program instructions and communication with computing system 130. In another embodiment, client device 120 represents a computing system utilizing clustered computers and components to act as a single pool of seamless resources. In general, client device 120 can be any computing device or a combination of devices with access to computing system 130 and network 110 and is capable of executing CNN interface 122 and vector visualization program 126. Client device 120 may include internal and external hardware components, as depicted and described in further detail with respect to FIG. 1.

In this exemplary embodiment, CNN interface 122, sensors 124 and client logic 126 are stored on client device 120. However, in other embodiments, CNN interface 122, sensors 124 and client logic 126 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between client device 120 and computer system 130, in accordance with a desired embodiment of the present invention.

Client device 120 includes CNN interface 122. CNN interface 122 provides an interface between client device 120 and computer system 130. In some embodiments, CNN interface 122 can be a graphical interface (GUI) or a web user interface (WUI) and can display text, documents, web browser, windows, user options, application interfaces, and instructions for operation, and includes the information (such as graphic, text, and sound) that a program presents to a user and the control sequences the user employs to control the program. In some embodiments, client device 120 accesses data communicated from computer system 130 via client-based application that runs on client device 120. For example, client device 120 includes mobile application software that provides an interface between client device 120 and computer system 130, server system 140, and server system 150.

In various embodiments of the present invention, computer system 130 is a computing device that can be a standalone device, a server, a laptop computer, a tablet computer, a netbook computer, a personal computer (PC), or a desktop computer. In another embodiment, computer system 130 represents a computing system utilizing clustered computers and components to act as a single pool of seamless resources. In general, computer system 130 can be any computing device or a combination of devices with access to client device 120 and network 110 and is capable of executing image analyzation program 132. Computer system 130 may include internal and external hardware components, as depicted and described in further detail with respect to FIG. 1.

In this exemplary embodiment, image analyzation program 132 and database are stored on computer system 130. However, in other embodiments, image analyzation program 132 and database 134 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between client device 120 and computer system 130, in accordance with a desired embodiment of the present invention.

In the embodiment depicted in FIG. 1, image analyzation program 132, at least in part, has access to CNN interface 122 and can communicate data stored on computer system 130 to client device 120. More specifically, CNN interface 122 defines a user of client device 120 that has access to data stored on database 134.

In the embodiment depicted in FIG. 1, client logic 126 utilizes, at least in part, the data stored on database 134 to manage access to CNN interface 122 in response to a query image requests from client device 120 (i.e., from user of client device 120, alternatively referred to herein as "requestor"). More specifically, client logic 126 defines a query image vector-array that represents various attributes about a targeted-object in a digital image, and that associates the query image vector-array with client device 120 sensors.

CNN interface 126 and client logic 126 are depicted in FIG. 1 for illustrative simplicity, client device 120, however, can include any number of logics and/or applications that are managed in accordance with client logic 126. In general, client logic 126 represents a physical or virtual resource to which the user represented by client device 120 wishes to manage access. In some embodiments, client logic 126 represents information and CNN interface 122 represents code that provides an ability to take specific action with respect to another physical or virtual resource and CNN interface 122 manages the ability to take such actions. In yet some embodiments, client logic 126 represents control over a physical or virtual resource and CNN interface 122 manages the ability to use and modify the resource. Client logic 126 can also represent any combination of the aforementioned elements. To illustrate various aspects of the present invention, examples of client logic 126 are presented in which client logic 126 represents one or more of: query image transaction, a user profile transaction, or a visually guided deep-search transaction, are presented, but embodiments of client logic 126 are not limited thereto. Embodiments of the present invention recognize that client logic 126 may include other forms of transactions that are known in the art.

Image analyzation program 132 is depicted in FIG. 1 for illustrative simplicity, computer system 130, however, can include any number of programs and/or applications that are managed in accordance with image analyzation program 132. In general, image analyzation program 132 represents a physical or virtual resource to which the administrator of the program represented by computer system 130 wishes to manage access. In some embodiments, image analyzation program 132 presents information and database 134 manages the ability to retrieve the information. In some embodiments, image analyzation program 132 represents code that provides an ability to take specific action with respect to another physical or virtual resource. In some embodiments, image analyzation program 132 represents control over a physical or virtual resource and image analyzation program 132 manages the ability to use and modify the resource. Image analyzation program 132 can also represent any combination of the aforementioned elements. To illustrate various aspects of the present inventions, examples of image analyzation program 132 are presented in which image analyzation program 132 represents one or more of: query image transaction, a user profile transaction, or a visually guided deep-search transaction, are presented, but embodiments of image analyzation program 132 are not limited thereto. Embodiments of the present invention recognize that image analyzation program 132 may include other forms of transactions that are known in the art.

In some embodiments of the present invention, vector visualization program 126 operates to transmit a query image transaction request (i.e., query processing) to computer system 130 and configure client device 120 and/or present any feedback (i.e., coaching) that client device 120 receives from image analyzation program 132 in response to the query image transaction request. In some embodiments, vector visualization program 126 also represents one or more elements of image analyzation program 132. For example, vector visualization program 126 can include functionality for determining a targeted object from an image by extracting the feature vectors of the targeted image on client device 120, as described herein. CNN interface 122 can also represent a user interface ("UI") that operates to provide a UI (e.g., a graphical interface ("GUI")) to a user of client device 120. In certain such embodiments, the UI of CNN interface 122 operates to receive user input from the user of client device 120, thereby enabling the user to interact with vector visualization program 126 executing on client device 120. In certain such embodiments, the UI of vector visualization program 126 can also operate to enable the user to access and/or interact with computer system 130 through the authentication of the user via image analyzation program 132. In certain such embodiments, it is to be understood that computing environment 100 can include a plurality of computing devices without departing from the scope of the present invention.

In some embodiments depicted in FIG. 1, client device 120 communicates with computer system 130 based, at least in part, on vector visualization program 126 and CNN interface 122. Vector visualization program 126 generates a query image transaction request based, at least in part, but is not limited to, an image being scanned (i.e., sensitivity visualization), extracting the vector-array of the targeted object's features and characteristics, and photo quality. CNN interface 122 communicates the query image transaction request to image analyzation program 132. Vector visualization program 126 determines that a query image transaction request is communicated to computer system 130 based, at least in part, on data obtained from sensors 124.

In various embodiments depicted in FIG. 1, client device 120 utilizes sensors 124 (e.g., camera, computing device capable of capturing a digital image) to create a primary digital image (i.e., search image), and client device 120 populates the primary digital image on CNN interface 122. Client device 120 communicates the digital image to vector visualization program 126. Vector visualization program 126 operates to analyze the primary digital image and generate an array of high n-dimensional vectors. Vector visualization program 126 generates an array of high n-dimensional vectors that correlate with unique features and characteristics of the targeted object in the primary digital image. Vector visualization program 126 populates the primary digital image on CNN interface 122, and vector visualization program 126 further embeds the array of high n-dimensional vectors on the primary digital. In some embodiments, client device 120 receives a primary digital image from another computing device (not shown).

In one embodiment, client device 120 receives a request from user input to redefine the targeted object in the primary digital image, utilizing CNN interface 122 to analyze the primary digital image. In various embodiments, vector visualization program 126 initiates query processing with a database and retrieves a list of instructions to analyze a primary digital image. In some embodiments, user input provides instructions to focus the scope of the target on the primary digital image to a particular set of objects contained within the primary digital image. Client device 120 receives the list of instructions to redefine the focus of the targeted object and submits the request to vector visualization program 126. Vector visualization program 126 re-analyzes the primary digital image with the redefined targeted object and generates an array of high n-dimensional vectors that correlate with the unique features of the redefined targeted object.

In various embodiments, image analyzation program 132 represents a convolutional neural network (CNN). Wherein, the CNN consists of I/O, as well as multiple hidden layers of neurons (i.e., RELU layer). Image analyzation program 132 operates to cross-correlate digital images based, at least in part, on the high n-dimensional vector array generated by analyzing the targeted object in the primary digital image. In various embodiments, similarity of the digital images can be identified based, at least in part, on the distance of the high n-dimensional vectors utilizing Euclidean distance and/or cosine distance, between the n-dimensional vector arrays. Image analyzation program 132 generates a map of digital images based, at least in part, on (i) the primary digital image and (ii) the n-dimensional vector array of the targeted image. Further, image analyzation program 132 determines the quantity of digital images to the near specified value (i.e., 5000 digital images). Image analyzation program 132 reduces the dimensionality (i.e., 2D/3D) of the high n-dimensional vector array of the digital images (i.e., t-SNE). Image analyzation program 132 generates a 3D visualization of digital images (i.e., map) similar to (i) the primary digital image and (ii) the high n-dimensional vector array of the targeted object. Further, the 3D visualization identifies a threshold of similarity to the primary digital image. The 3D visualization displays the assigned threshold of similarity to the dimensions of the primary digital image.

In some embodiments, image analyzation program 132 operates to monitor the primary digital images submitted through an image query transaction request, as well as, to monitor user input to learn features and characteristics of an image that are requested to be analyzed. Image analyzation program 132 analyzes the I/O submitted through requests and processes the I/O for future use based, at least in part, by applying the present I/O to future convolutional layers. For example, a primary digital image displays a zebra and vector visualization program 126 analyzes the primary digital image and generates a heat map depicting the high n-dimensional vectors of the targeted object (e.g., zebra). Vector visualization program 126 transmits an image query transaction request to image analyzation program 132. Image analyzation program 132 operates to analyze the heat map of the primary digital image (e.g., zebra) and conducts a query processing on database 134 based, at least in part, on the heat map. Image analyzation program 132 retrieves a plurality of digital images that contain similar features and/or characteristics to the heat map of the primary digital image. Image analyzation program 132 generates a map of digital images retrieved from database 134, as discussed below. Image analyzation program 132 further operates to embed the map of digital images and partition the images into regions that represent a threshold of similarity to the digital image and color codes the regions. Image analyzation program 132 transmits the map to CNN interface 122, and CNN interface 122 populates client device 120 with the map of digital images.

In various embodiments depicted in the present invention, client device 120 receives user input through CNN interface 122. User input can include, but is not limited to, instructions (i.e., I/O) for vector visualization program 126 to define the targeted object in the primary digital image. Further, user input can be utilized by vector visualization program 126 to determine the targeted object and generate an array of high n-dimensional vectors based, at least in part, on the instructions to define the targeted object. Client device 120 can receive user input to focus the area for vector visualization program 126 to analyze to a region within the primary digital image. For example, the primary digital image displays an image of a zebra, user input can define that the targeted object of the primary digital image be focused to the stripes of a zebra, as opposed to the entire body of the zebra in the primary digital image. In some embodiments, vector visualization program 126 can communicate with a database (i.e., database 134) and retrieve a predefined set of instructions to determine the targeted object in a primary digital image.

In some embodiments, CNN interface 122 receives user input to alter, modify, and/or redefine the focus of the targeted object in the primary digital image. CNN interface 122 communicates the user input to vector visualization program 126 to reanalyze the modifications to the focus of the targeted object. For example, the primary digital image displays a zebra, however, the map of digital images presents images of different breeds of horses and not zebras. CNN interface 122 receives user input to alter, modify, and/or redefine the focus of the targeted object in the primary digital image to the patterned stripes of the zebra. CNN interface 122 communicates the user input to vector visualization program 126, wherein, vector visualization program 126 reanalyzes the targeted object as defined by the user input (i.e., modified targeted object) and generates a second high n-dimensional vector array based on the modified targeted object. As discussed above, vector visualization program communicates the vector array to image analyzation program 132. Image analyzation program 132 conducts a query processing based, at least in part, on the second vector array. Image analyzation program 132 communicates with database 134 to perform a deep search to identify a plurality of digital images. Image analyzation program 132 retrieves a plurality of digital images from database 134 and generates a second map of digital images. In accordance with the present invention, as discussed below, image analyzation program 132 annotates the map of digital images with coded regions, of the retrieved search results based, at least in part, on an organization of those images according to which characteristics of each particular image. For example, image analyzation program 132 generates a map of digital images in accordance with the present embodiment in generating a map with characteristics similar to the stripes on a zebra. Image analyzation program 132 communicates the second map to client device 120, and CNN interface 122 populates the second map on client device 120.

In one embodiment and example, a user submits a given image, a primary digital image, for query analysis. Image analyzation program 132 identifies a plurality of characteristics that are included in the image and runs a broad search for images that include those characteristics. Image analyzation program 132 generates a map, which may have color coded regions, of the retrieved search results, i.e., images, based, at least in part on an organization of those images according to which characteristics of each particular image includes. The user is presented with this visual mapping of the search results and makes selections to indicate which portion(s) of the map include search results that best correlate to the search image. Vector visualization program 126 monitors the user selections to refine, and in various embodiments determine, the characteristics of the current map search results. Image analyzation program 132 analyzes the user selections to refine the characteristics used when generating future search queries. In one embodiment, image analyzation program 132 presents the user with the results of two or more image maps where a subsequent map is generated using a refined version of characteristics used to generate a previous map. This may be seen as a parent-child type of relationship between the maps such that the child is generated using only some of the characteristics of the parent. In some scenarios and embodiments, a child map includes characteristics that were not present in the parent. For example, the parent includes characteristics A, B, and C. Characteristic B is selected by the user and a subsequent set of search results, in the form of a child map, includes images that are visually organized using characteristics B, E, and F.

For example, digital images that are assigned a threshold that is highly similar to the primary digital image will have a green border around the digital image, digital images that are assigned a threshold that has a medium similarity to the primary digital image has a yellow border around the digital image, and digital images that are assigned a low similarity threshold to the primary digital image will have a red border around the digital image. Image analyzation program 132 communicates the compilation of the low dimensional digital images to client device 120. Vector visualization program 126 populates the compilation of digital images on CNN interface 122.

In various embodiments, client device 120 receives user input to navigate the 3D visualization. Further, client device 120 receives user input to navigate between the digital images embedded in the 3D visualization to locate the most similar digital image to the targeted object. In some embodiments, client device 120 receives user input that identifies a section of digital images in the 3D visualization to narrow the scope of the 3D visualization. Vector visualization program 126 operates to generate a modified 3D visualization and populates CNN interface 122 with the modified 3D visualization. Client device 120 receives user input to navigate the modified 3D visualization to identify the most similar digital image to the targeted object.

Figure 2:
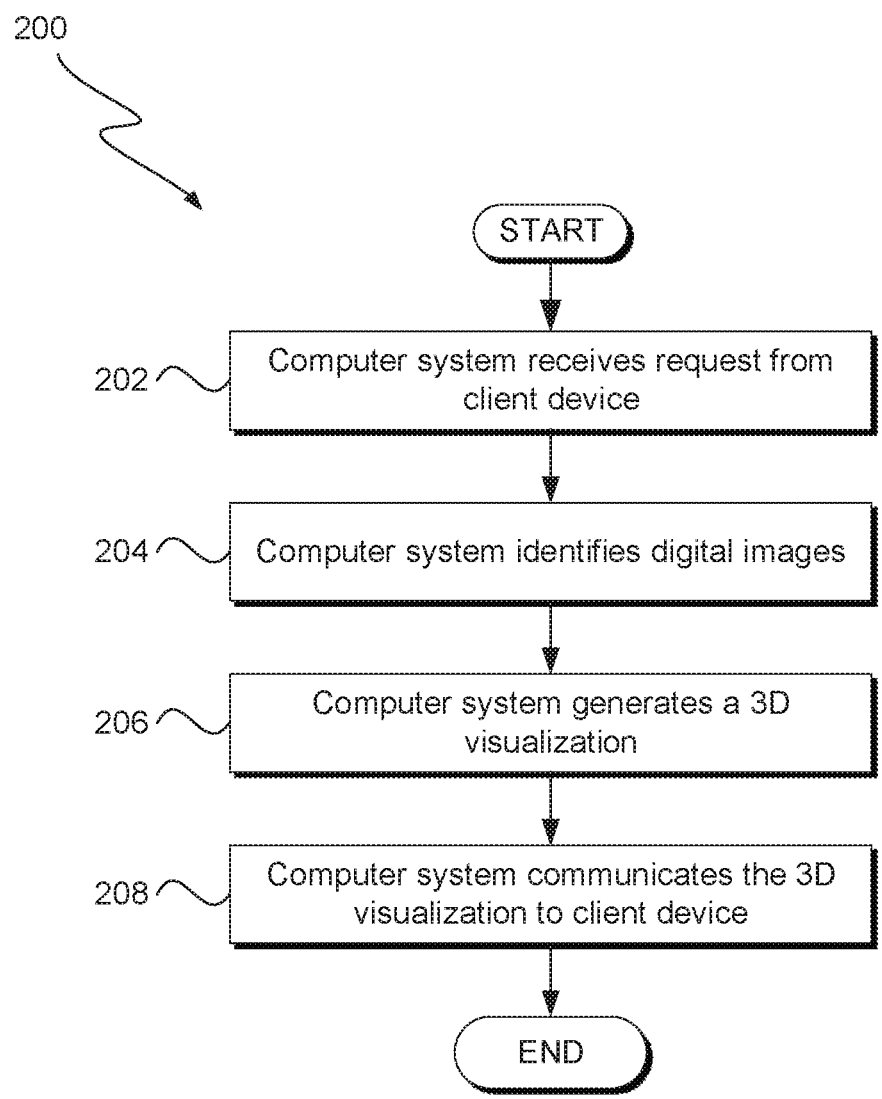
FIG. 2 illustrates operational processes of a neural network search system executing operations to generate a neural network map, on a computing device within the environment of FIG. 1, in accordance with an exemplary embodiment of the present invention.

FIG. 2 is a flowchart depicting operations for executing a neural network search system for computing environment 100, in accordance with an illustrative embodiment of the present invention. More specifically, FIG. 2, depicts combined overall operations 200, of CNN interface 122, sensors 124 and vector visualization program 126 executing on client device 120, and image analyzation program 132 executing on computer system 130. In some embodiments, operations 200 represents logical operations of image analyzation program 132, wherein vector visualization program 126 represents interactions between logical units executing on client device 120. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, of flowchart 200, can be performed simultaneously. Additionally, the series of operations, in flowchart 200, can be terminated at any operation. In addition to the features previously mentioned, any operations, of flowchart 200, can be resumed at any time.

In operation 202, computer system 130 receives a query image transaction request from client device 120. As recognized above, the query image transaction request is generated by a digital image populated on client device 120. In various embodiments, client device 120 receives instructions from user input to analyze a digital image to determine the targeted image. In some embodiments, vector visualization program 126 can retrieve a set of predefined instructions by accessing a database (i.e., database 134) to analyze a digital image to determine the targeted object. Vector visualization program 126 receives the instructions and analyzes the digital image, generating a heat map that incorporates an array of high n-dimensional vectors that define the targeted object. Vector visualization program 126 embeds the heat map onto the digital image, and generates a query image transaction request based, at least in part, on the digital image embedded with the heat map. Further, vector visualization program 126 generates a query image transaction request based, at least in part, on (i) the digital image with the embedded heat map and (ii) instructions for image analyzation program 132 to conduct a query processing for a set of digital images. Computer system 130 receives the query image transaction request and image analyzation program 132 retrieves the request and analyzes the digital image and instructions to perform a query processing for similar images.

In operation 204, responsive to receiving a request from client device 120, computer system 130 operates to identify a plurality of digital images located on a database located on computer system 130 (i.e., database 134) and/or on a database located on separate computer system (not shown). Image analyzation program 132 identifies a plurality of digital images based, at least in part, on the targeted object represented by the vector array identified in the request. Image analyzation program 132 compiles the plurality of digital images to generate a 3D visualization.

In operation 206, image analyzation program 132 compiles the plurality of digital images to create a 3D visualization (e.g., map). Image analyzation program 132 reduces the dimensionality of the digital images to generate a low dimension visualization (i.e., 2D/3D). Further, image analyzation program 132 embeds the plurality of digital images in the low dimension visualization. In various embodiments, image analyzation program 132 operates to determine the similarity of regions of digital images and assign weights to the regions based, at least in part, on the vector array of (i) the plurality of digital images and (ii) the targeted object of the primary digital image.

In some embodiments, image analyzation program 132 operates as an autoencoder to extract the vector array from the primary digital image to represent the targeted object and generate a representation with a plurality of digital images. Further, image analyzation program 132 extracts the vector array from the primary digital image and compares the array against the vector arrays in the indexed digital images stored on a database (i.e., database 134). Image analyzation program 132 operates to retrieve a plurality of digital images from a database (i.e., database 134) and utilizes the vector array from the targeted object to generate a reconstruction of the digital image based on the plurality of similar indexed digital images. Image analyzation program 132 determines based, at least in part, on (i) the vector array of the primary digital image and (ii) the representations of the plurality of indexed digital images, that various images from the plurality of indexed digital images have similar characteristics and features to the primary digital image. Image analyzation program 132 retrieves the indexed digital images that have similar characteristics and features to the primary digital image and generates a map of digital images and arranges the similar indexed digital images into regions of similarity based, at least in part, on the characteristic and feature identified in the indexed digital image.

In various embodiments as depicted in the operations of FIG. 2, image analyzation program 132 operates to reduce the dimensionality of the (i) vector array of the targeted object of the primary digital image and (ii) the vector array of the various indexed digital images. Image analyzation program 132 operates as a neural network, and reduces the dimensionality (i.e., any dimension greater than 3D) of the vector arrays to generate a visual representation (e.g., 2D/3D) to be populated on client device 120. In various embodiments, while image analyzation program 132 operates to reduce the dimensionality of the plurality of indexed digital images and the primary digital image, image analyzation program 132 operates to ensure that the distances between the images in the high n-dimensional space is maintained in the low (2D/3D) dimensional space. Further, image analyzation program 132 generates a visualization (e.g., map) in a dimensionality (i.e., 2D/3D) that is compatible of being viewed on a computing device. As recognized above, image analyzation program 132 generates a map, which may have color coded regions illustrating the threshold of similarity of characteristics and features of the indexed digital images in comparison to the targeted object of the primary digital image based, at least in part, on the vector array generated by vector visualization program 126.

In operation 208, computer system 130 communicates the map of digital images to client device 120. Client device 120 operates to populate the map utilizing CNN interface 122. CNN interface 122 operates to receive instructions to navigate the map of digital images by user input.

In one embodiment, responsive to receiving a request from a client device (i.e., from a user of client device 120, operation 202), computer system 130 operates to identify a compilation of digital images that are similar to (i) the primary digital image and (ii) the high n-dimensional vector array of the targeted object (operation 204). Computer system 130 generates a 3D visualization of the compiled digital images, by transforming the digital images from a high dimensional to a low dimensional field (operation 206). In operation 208, computer system 130 communicates the 3D visualization to client device 120, wherein vector visualization program 126 populates CNN interface 122 with the 3D visualization.

Figure 3:
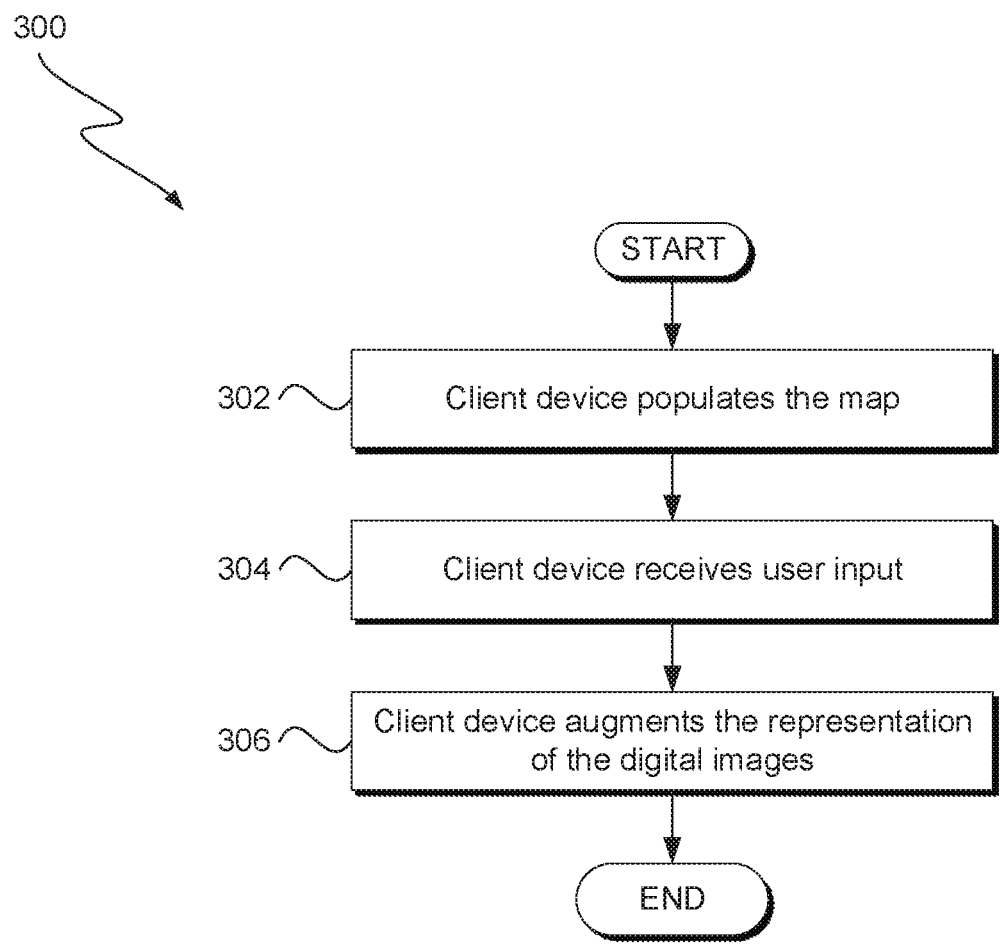
FIG. 3 illustrates operational processes of a neural network search system executing operations to navigate a neural network map and conduct machine learning, on a computing device within the environment of FIG. 1, in accordance with at least one embodiment of the present invention.

FIG. 3 depicts a flowchart depicting operations for executing operations on receiving instructions by user input to navigate the 3D visualization and determine whether the selected image is the most relevant image based, at least in part, on the similarity to the primary digital image within the computing environment 100 depicted in FIG. 1, in accordance with an embodiment of the present invention.

Operations 300 represents logical operations of image analyzation program 132 and vector visualization program 126 that interact and influence operations 200 of image analyzation program 132 of computer system 130, as depicted in FIG. 2. In some embodiments, operations 300 can include one or more elements of operations 200, in which case, interactions between operations 200 and 300 represent logic of image analyzation program 132 and vector visualization program 126.

In operation 302, client device 120 receives a map of digital images, as recognized above, from image analyzation program 132. Client device 120 utilizes CNN interface 122 to populate the map of digital images on the display screen of client device 120. Vector visualization program 126 operates to continuously monitor the data (e.g., user input) received from CNN interface 122, as recognized in the features above.

In operation 304, CNN interface 122 receives data (e.g., user input) and communicates the data to vector visualization program 126. In various embodiments, CNN interface 122 receives data instructing CNN interface 122 to navigate the map displayed on client device 120. One having ordinary skill in the art will recognize that to navigate the map displayed on client device 120, means to move the highlighted image on the display screen to another image based, at least in part, on a directional input from a user. Further, CNN interface 122 can receive data instructing CNN interface 122 to remove a region of images from the map. CNN interface 122 communicates these removal instructions to vector visualization program 126, which operates to augment the map by removing the region of digital images from the map and communicating the augmented map to CNN interface 122 to populate the on the display screen of client device 120. Further, vector visualization 126 operates to continuously monitor the data received through user input and analyzes the data to learn which digital images the user is searching for based, at least in part, on the characteristics and features determined by the vector array of the digital images. Further, vector visualization program 126 stores this data on a database (i.e., database 134) for future analyzation, during, at least, a second query image transaction request. In some embodiments, vector visualization program 126 communicates this data to image analyzation program 132 for analyzation and to store this data on a database for later use.

In some embodiments, CNN interface 122 receives data (i.e., user input) instructing CNN interface 122 to populate the map with digital images that contain specific characteristic and features. CNN interface 122 communicates these instructions to vector visualization program 126 for analyzation. Vector visualization program 126 operates to augment the map based, at least in part, on the data received and augments the map to display regions of digital images that contain characteristics and features analyzed from the data (i.e., user input). Vector visualization program 126 communicates the augmented map to CNN interface 122, and CNN interface 122 populates the display screen of client device 120 with the augmented map. As recognized above, vector visualization analyzes the data received, and learns and predicts the digital images that the user would want displayed for future use. Vector visualization program 126 stores this data on a database (i.e., database 134) for future use. In some embodiments, vector visualization program 126 communicates this data to image analyzation program 132 for analyzation and to store this data on a database for later use.

In various embodiments as depicted in FIG. 3, vector visualization program 126 operates to continuously monitor the data (i.e., user input) received by CNN interface 122. For example, CNN interface 122 receives data (i.e., user input) about an image selection, that has a lower threshold of similar characteristics and features based, at least in part, on the vector array of the digital image than digital images that are represented on the map and have a higher threshold of characteristics and features than the selected image. Vector visualization program 126 operates to analyze the data received and learns to predict the characteristics and features the user is searching for, at least, during a second query image transaction request. Further, during, at least, a second query image transaction request, vector visualization program 126 operates to place the selected image in a higher threshold region during the, at least, second generation of a map of digital images based, at least in part, on the primary digital image. In various embodiments, vector visualization program 126 operates to utilize user feedback to identify the indexed digital image the user is searching for and operates to navigate the user in the n-dimensional space in the correct direction.

In some embodiments, vector visualization program 126 is continuously monitoring the data (i.e., user input) received by CNN interface 122. Vector visualization program 126 operates to analyze the data and learn to anticipate and compute the similarity of digital images, based at least in part, on (i) the characteristics and similarity of selected images and (ii) by extracting the vector array of the primary digital image and generating a representation of the vector array of the primary digital image against a plurality of indexed digital images.

In operation 306, vector visualization program 126 receives instructions from CNN interface 122 to augment the map of digital images based, at least in part, on the instructions received by CNN interface 122. As recognized above, vector visualization program 126 augments the map based, at least in part, on the instructions provided. For example, vector visualization program 126 receives instructions to remove a region of images from the map based, at least in part, on the characteristics and/or features of the region. In another example, vector visualization program 126 receives instructions to crop the map on a particular region based, at least in part, on user input. In various embodiments, vector visualization program 126 operates to analyze the data received to augment the map and determines patterns for allocating and condensing future regions of digital images based, at least in part, on the data received. Lastly, vector visualization program 126 communicates the augmented map to CNN interface 122 to populate on the display screen of client device 120.

Figure 4:
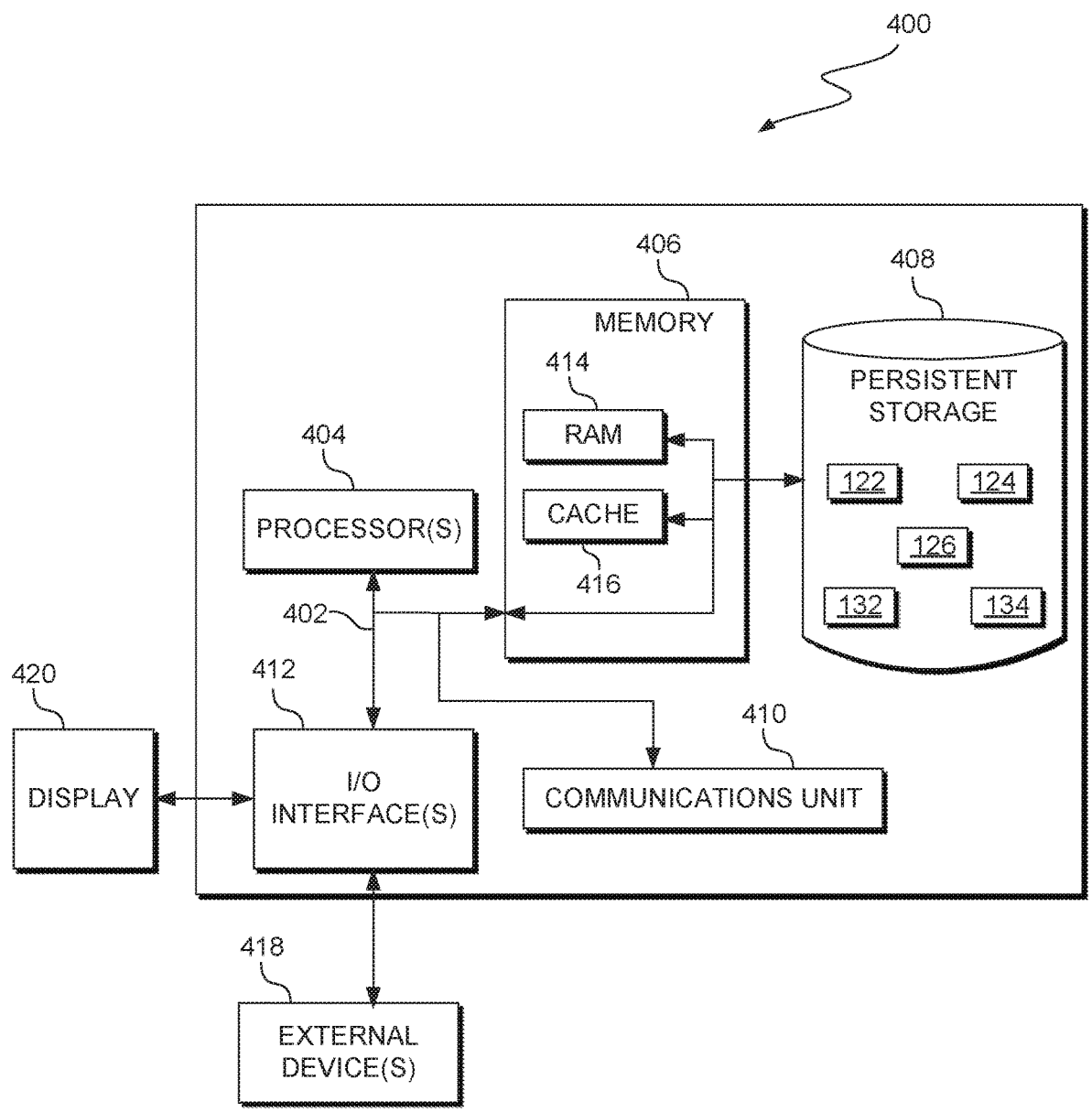
FIG. 4 depicts a block diagram of components of one or more computing devices within the computing environment depicted in FIG. 1, in accordance with an exemplary embodiment of the present invention.

FIG. 4 depicts a block diagram, 400, of components of client device 120 and computer system 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client device 120 and computer system 130 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache 416. In general, memory 406 can include any suitable volatile or non-volatile computer-readable storage media.

CNN interface 122, sensors 124, vector visualization program 126, image analyzation program 132, and database 134 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110. In these examples, communications unit 410 includes one or more network interface cards. Communications unit 410 may provide communications through the use of either or both physical and wireless communications links. CNN interface 122, sensors 124, vector visualization program 126, image analyzation program 132, and database 134 may be downloaded to persistent storage 308 through communications unit 410.

I/O interface(s) 412 allows for input and output of data with other devices that may be connected to client device 120 and computer system 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., CNN interface 122, sensors 124, vector visualization program 126, image analyzation program 132, and database 134, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method for executing a neural network search system, the method comprising:
    analyzing, by one or more processors, a first digital image;
    determining, by one or more processors, a targeted object in the first digital image based, at least in part, on (i) one or more characteristics of the first digital image and (ii) a feature of the targeted object;
    generating, by one or more processors, a vector array based, at least in part, on (i) the first digital image and (ii) the targeted object;
    analyzing, by one or more processors, the vector array;
    determining, by one or more processors, the targeted object based, at least in part, on the vector array;
    generating, by one or more processors, a query processing based, at least in part, on the vector array of the first digital image;
    identifying, by one or more processors, a plurality of digital images based, at least in part, on the similarity of the plurality of digital images and (i) the first digital image and (ii) the targeted object; and
    responsive to identifying a plurality of digital images, generating, by one or more processors, a query map.

2. The method of claim 1, the method further comprising:
    populating, by the one or more processors, the first digital image on a computing device;
    responsive to populating the first digital image on a computing device, analyzing, by the one or more processors, the first digital image;
    identifying, by the one or more processors, dimensions of the characteristics and the features of the first digital image based, at least in part, on the vector array;
    identifying, by the one or more processors, the targeted object in the first digital image based, at least in part, on (i) the characteristics and features of the first digital image and (ii) the dimensions of the characteristics and the features of the first digital image; and generating, by the one or more processors, a vector array based, at least in part, on (i) the characteristics and features of the first digital image and (ii) the dimensions of the characteristics and features of the first digital image.

3. The method of claim 1, the method further comprising:

responsive to generating the vector array based, at least in part, on the characteristic and features of the first digital image, analyzing, by the one or more processors, the vector array;

identifying, by the one or more processors, a plurality of indexed digital images located on a database, wherein the plurality of indexed digital images have (i) an associated vector array and (ii) the dimensions of the associated vector array;

analyzing, by the one or more processors, one or more vector array associated with the plurality of indexed digital images;

determining, by the one or more processors, a minimum threshold of similarity of the plurality of indexed images to the first digital image based, at least in part, on (i) the characteristics and features of the plurality of indexed digital images and (ii) the dimensions of the plurality of indexed digital images; and matching, by the one or more processors, a plurality of indexed digital images associated with the first digital image based, at least in part, on (i) the characteristics and features of the first digital image and (ii) the dimensions of the first digital image.

4. The method of claim 3, the method further comprising:

responsive to identifying a plurality of indexed digital images based, at least in part, on matching the plurality of indexed digital images associated with the first digital image, reducing the dimensions of the vector array of (i) the first digital image and (ii) the plurality of indexed digital images.

5. The method of claim 3, the method further comprising:

generating, by the one or more processors, a map of the indexed digital images based, at least in part, on the plurality of indexed images that have been determined to meet the minimum threshold of similarity;

assembling, by the one or more processors, the map of the indexed digital images into regions based, at least in part, on the threshold of similarity between the plurality of indexed images and the first digital image; and sending, by the one or more processors, the map of the indexed digital images.

6. The method of claim 1, the method further comprising:

receiving, by the one or more processors, data that dictates, based on a set of rules, a client device to augment the map of the indexed digital images;

responsive to receiving data to augment the map of the indexed digital images, analyzing, by the one or more processors, the data to generate a second map of indexed digital images;

generating, by the one or more processors, a second map of the indexed digital images displaying an augmented map on the client device;

monitoring, by the one or more processors, data received on the client device;

determining, by the one or more processors, that a selection of an image from the second map of indexed digital images has been performed; and updating, by the one or more processors, the threshold of similarity threshold based, at least in part, on the selection of the image.

7. The method of claim 1, the method further comprising:

monitoring, by the one or more processors, for data received by the client device; and analyzing, by the one or more processors, the data received by the client device.

8. A computer program product for executing a neural network search system, the computer program product comprising:

one or more computer-readable storage media and program instructions stored on the one or more computer-readable storage media, the program instructions comprising:

program instructions to analyze a first digital image;

program instructions to determine a targeted object in the first digital image based, at least in part, on (i) one or more characteristics of the first digital image and (ii) a features of the targeted object;

program instructions to generate a vector array based, at least in part, on (i) the first digital image and (ii) the targeted object;

program instructions to analyze the vector array;

program instructions to determine the targeted object based, at least in part, on the vector array;

program instructions to generate a query processing based, at least in part, on the vector array of the first digital image;

program instructions to identify a plurality of digital images based, at least in part, on the similarity of the plurality of digital images and (i) the first digital image and (ii) the targeted object; and responsive to program instructions to identify a plurality of digital images, program instructions to generate a query map.

9. The computer program product of claim 8, the program instructions further comprising:

program instructions to populate the first digital image on a computing device;

responsive to program instructions to populate the first digital image on a computing device, program instructions to analyze the first digital image;

program instructions to identify dimensions of the characteristics and the features of the first digital image based, at least in part, on the vector array;

program instructions to identify the targeted object in the first digital image based, at least in part, on (i) the characteristics and features of the first digital image and (ii) the dimensions of the characteristics and the features of the first digital image; and program instructions to generate a vector array based, at least in part, on (i) the characteristics and features of the first digital image and (ii) the dimensions of the characteristics and features of the first digital image.

10. The computer program product of claim 8, the program instructions further comprising:

response to program instructions to generate the vector array based, at least in part, on the characteristics and features of the first digital image, program instructions to analyze the vector array;

program instructions to identify a plurality of indexed digital images located on a database, wherein the plurality of indexed digital images have (i) an associated vector array and (ii) the dimensions of the associated vector array;

program instructions to analyze one or more vector array associated with the plurality of indexed digital images;

program instructions to determine a minimum threshold of similarity of the plurality of indexed digital images to the first digital image based, at least in part, on (i) the characteristics and features of the plurality of indexed digital images and (ii) the dimensions of the plurality of indexed digital images; and program instructions to match a plurality of indexed digital images associated with the first digital image based, at least in part, on (i) the characteristics and features of the first digital image and (ii) the dimensions of the first digital image.

11. The computer program product of claim 10, the program instructions further comprising:

responsive to program instructions to identify a plurality of indexed digital images based, at least in part, on matching the plurality of indexed digital images associated with the first digital image, program instructions to reduce the dimensions of the vector array of (i) the first digital image and (ii) the plurality of indexed digital images.

12. The computer program product of claim 10, the program instructions further comprising:

program instructions to generate a map of the indexed digital images based, at least in part, on the plurality of indexed digital images that have been determined to meet the minimum threshold of similarity;

program instructions to assemble the map of the indexed digital images into regions based, at least in part, on the threshold of similarity between the plurality of indexed digital images and the first digital image; and program instructions to send the map of the indexed digital images.

13. The computer program product of claim 8, the program instructions further comprising:

program instructions to receive data that dictates, based on a set of rules, a client device to augment the map of the indexed digital images;

responsive to program instructions to receive data to augment the map of the indexed digital images, program instructions to analyze the data to generate a second map of indexed digital images;

program instructions to generate a second map of the indexed digital images displaying an augmented map on the client device;

program instructions to monitor data received on the client device;

program instructions to determine that a selection of an image from the second map of indexed digital images has been performed; and program instructions to update the threshold of similarity threshold based, at least in part, on the selection of the image.

14. The computer program product of claim 8, the program instruction further comprising:

program instructions to monitor for data received by the client device; and program instructions to analyze the data received by the client device.

15. A computer system for executing a neural network search system, the computer system comprising:

one or more computer processors;

one or more computer readable storage medium; and program instructions stored on the computer readable storage medium for execution by at least one of the one or more processors, the program instructions comprising:

program instructions to analyze a first digital image;

program instructions to determine a targeted object in the first digital image based, at least in part, on (i) one or more characteristics of the first digital image and (ii) a features of the targeted object;

program instructions to generate a vector array based, at least in part, on (i) the first digital image and (ii) the targeted object;

program instructions to analyze the vector array;

program instructions to determine the targeted object based, at least in part, on the vector array;

program instructions to generate a query processing based, at least in part, on the vector array of the first digital image;

program instructions to identify a plurality of digital images based, at least in part, on the similarity of the plurality of digital images and (i) the first digital image and (ii) the targeted object; and responsive to program instructions to identify a plurality of digital images, program instructions to generate a query map.

16. The computer system of claim 15, the program instruction further comprising:

program instructions to populate the first digital image on a computing device;

responsive to program instructions to populate the first digital image on a computing device, program instructions to analyze the first digital image;

program instructions to identify dimensions of the characteristics and the features of the first digital image based, at least in part, on the vector array;

program instructions to identify the targeted object in the first digital image based, at least in part, on (i) the characteristics and features of the first digital image and (ii) the dimensions of the characteristics and the features of the first digital image; and program instructions to generate a vector array based, at least in part, on (i) the characteristics and features of the first digital image and (ii) the dimensions of the characteristics and features of the first digital image.

17. The computer system of claim 15, the program instruction further comprising:

responsive to program instructions to generate the vector array based, at least in part, on the characteristics and features of the first digital image, program instructions to analyze the vector array;

program instructions to identify a plurality of indexed digital images located on a database, wherein the plurality of indexed digital images have (i) an associated vector array and (ii) the dimensions of the associated vector array;

program instructions to analyze one or more vector array associated with the plurality of indexed digital images;

program instructions to determine a minimum threshold of similarity of the plurality of indexed digital images to the first digital image based, at least in part, on (i) the characteristics and features of the plurality of indexed digital images and (ii) the dimensions of the plurality of indexed digital images; and program instructions to match a plurality of indexed digital images associated with the first digital image based, at least in part, on (i) the characteristics and features of the first digital image and (ii) the dimensions of the first digital image.

18. The computer system of claim 17, the program instructions further comprising:
- responsive to program instructions to identify a plurality of indexed digital images based, at least in part, on matching the plurality of indexed digital images associated with the first digital image, program instructions to reduce the dimensions of the vector array of (i) the first digital image and (ii) the plurality of indexed digital images;
- program instructions to generate a map of the indexed digital images based, at least in part, on the plurality of indexed digital images that have been determined to meet the minimum threshold of similarity;
- program instructions to assemble the map of the indexed digital images into regions based, at least in part, on the threshold of similarity between the plurality of indexed digital images and the first digital image; and
- program instructions to send the map of the indexed digital images.

19. The computer system of claim 15, the program instructions further comprising:
- program instructions to receive data that dictates, based on a set of rules, a client device to augment the map of the indexed digital images;
- responsive to program instructions to receive data to augment the map of the indexed digital images, program instructions to analyze the data to generate a second map of indexed digital images;
- program instructions to generate a second map of the indexed digital images displaying an augmented map on the client device;
- program instructions to monitor data received on the client device;
- program instructions to determine that a selection of an image from the second map of indexed digital images has been performed; and
- program instructions to update the threshold of similarity threshold based, at least in part, on the selection of the image.

20. The computer system of claim 15, the program instructions further comprising:
- program instructions to monitor for data received by the client device; and
- program instructions to analyze the data received by the client device.

* * * * *